United States Patent [19]

Morawetz et al.

[11] 4,080,317

[45] Mar. 21, 1978

[54] HIGH MOLECULAR WEIGHT POLYCONDENSATES FROM SOLID PHASE CONDENSATION

[75] Inventors: Gottfried Morawetz; Lothar Buxbaum, both of Lindenfels, Germany

[73] Assignee: Ciba-Geigy AG, Basel, Switzerland

[21] Appl. No.: 635,364

[22] Filed: Nov. 26, 1975

Related U.S. Application Data

[63] Continuation-in-part of Ser. No. 489,899, Jul. 19, 1974, abandoned, which is a continuation of Ser. No. 385,800, Aug. 24, 1973, abandoned, which is a continuation-in-part of Ser. No. 192,049, Oct. 26, 1971, abandoned.

[30] Foreign Application Priority Data

Oct. 23, 1970  Austria ................................. 9572/70
Oct. 23, 1970  Austria ................................. 9573/70

[51] Int. Cl.² .................... C08G 63/14; C08G 63/18; C08G 63/26

[52] U.S. Cl. ............... 260/75 R; 260/47 C; 260/75 M

[58] Field of Search ............... 260/75 R, 75 M, 47 C

[56] References Cited

U.S. PATENT DOCUMENTS

| 2,901,466 | 8/1959 | Kibler et al. ................. 260/75 |
| 2,921,052 | 1/1960 | Caldwell et al. .............. 260/75 |
| 3,405,098 | 10/1968 | Heighton et al. ............. 260/75 |
| 3,544,523 | 12/1970 | Maxion ....................... 260/75 |
| 3,544,525 | 12/1970 | Balint et al. ................. 260/75 |
| 3,551,386 | 12/1970 | Berkau et al. ................ 260/75 |
| 3,657,388 | 4/1972 | Schweizer et al. ............ 260/873 |
| 3,801,547 | 4/1974 | Hoeschele .................... 260/75 |
| 3,816,377 | 6/1974 | Okuzumi ...................... 260/75 |

FOREIGN PATENT DOCUMENTS 6,807,708  12/1968  Netherlands.

*Primary Examiner*—Lester L. Lee
*Attorney, Agent, or Firm*—Berman, Aisenberg & Platt

[57] ABSTRACT

Polyester precondensates are catalytically polycondensed in solid phase at a constant temperature with a linear increase (during polycondensation) in intrinsic viscosity. The linear increase makes possible an accurate advance determination of reaction time required to produce thermoplastic polycondensate of the desired intrinsic viscosity.

13 Claims, 7 Drawing Figures

HIGH MOLECULAR WEIGHT POLYCONDENSATES FROM SOLID PHASE CONDENSATION

This application is a continuation-in-part of application Ser. No. 489,899 filed July 19, 1974 and now abandoned, which in turn is a continuation application of application Ser. No. 385,800 filed Aug. 24, 1973 and now abandoned, which in turn is a continuation-in-part application of parent application Ser. No. 192,049 filed Oct. 26, 1971, now abandoned.

BACKGROUND

Polycondensation in solid phase (solid phase condensation) of precondensates produced by melt polycondensation is known. High molecular weight polyesters (based on polyethylene terephthalate) are prepared by subjecting a precondensate (produced in the melt) of average molecular weight to polycondensation at a temperature below its melting point — that means in solid phase. Suitable processes are disclosed, e.g., in U.S. Pat. No. 3,405,098, in British Patent Specification Nos. 1,004,462 and 1,066,162 and in DOS No. 1,570,844. (DOS = German Offenlegungsschrift.)

Such processes have a series of grave disadvantages. According to U.S. Pat. No. 3,405,098, the precondensate must be ground before it is subjected to solid phase polycondensation. The grain size of the precondensate in this process must be reduced to 0.074 to 0.833 millimeters (mm) and, in addition, at most 10% of the resulting powder may have a particle size of less than 0.074 mm. This requires an elaborate and costly grinding and sifting process. Moreover, by this procedure a pulverized high molecular weight material (which is suitable only to a very limited extent for further processing, e.g. for processing in screw extruders) is obtained. In addition, pulverized material has a very large specific surface and readily absorbs moisture. In extruding polyesters, for instance, such moisture causes a distinct decrease in molecular weight by hydrolytic decomposition. Further, the average molecular weight and intrinsic viscosity increase continuously with time during solid phase polycondensation, but such increases are sufficiently irregular to preclude any accurate prediction of molecular weight after a fixed period of polycondensation time. In individual cases, solid phase polycondensation stops completely after a certain degree of "saturation" is reached.

British Pat. No. 1,004,462 requires starting with ground precondensate having an intrinsic viscosity limited to a stated range, namely: 0.33 to 0.43 deciliters/gram (dl/g), and additionally having a proportion of amorphous phase determined by means of differential thermal analysis. Although intrinsic viscosities of up to 1.5 dl/g are indicated in this patent, a maximum intrinsic viscosity of 0.73 dl/g is actually achieved in the Examples. The same disadvantages encountered in the process of U.S. Pat. No. 3,405,098 also prevail here. The precondensate has to be subjected to additional controlled cooling prior to grinding in order to attain the required proportion of amorphous phase. Moreover, stopping melt condensation at $[\eta]=0.33$ to 0.43 dl/g is uneconomical, but is required (when carrying out the process according to this patent) in order to facilitate essential grinding.

British Pat. No. 1,066,162 starts with granules of precondensate and obtains high final viscosities, but only after very long solid phase polycondensation periods. In Examples 2, 3, 4 and 11, reaction times of 193, 66, 153.5 and 191 hours (h) are indicated for reaching intrinsic viscosities of 1.54, 1.36, 1.63 and 1.47 dl/g (determined in 1% solutions of 1:1 phenol:tetrachloroethane at 30° C). [These values are converted from the relative viscosities of the patent specification.] FIG. 1 is a diagram for converting relative viscosity ($\eta$ rel) to intrinsic viscosity ($\eta$).

Although the intrinsic viscosity values thus obtained are high, the reaction times are unreasonably long. This is, perhaps, the major factor in the lack of predictability as to when a certain intrinsic viscosity may be reached. In certain individual cases, solid phase condensation stops entirely after a certain time (see Examples 2, 5, 8, 10 and 11 of the noted British Patent).

DOS No. 1,570,844 provides a process for shortening (by using precondensate particles of definite form and size) the diffusion path of volatile reaction products escaping during solid phase condensation. The particle sizes are from less than 0.2 mm to 2.2 mm. In addition, polycondensate viscosity and average molecular weight is controlled by granular size fractioning and recombining selected granular size fractions of the precondensate. The process, however, requires initial precondensate grinding, preparing particle fractions by selecting certain grinding sizes and, finally, recombining some of the particle fractions for a solid phase condensation batch for achieving a certain desired final viscosity and molecular distribution. A whole series of additional costly working procedures is then required. Moreover, the already nearly pulverized condensate particles are more difficult to process. If, in a further variant of this process, the grinding of the precondensate is omitted and the process starts out with precondensate particles (which are obtained in forming procedures other than grinding) of larger size and definite form, the processing behavior of the larger polycondensate particles is more favorable, but this advantage is gained at the expense of a considerably prolonged polycondensation period.

All of the solid phase condensation processes suggested thus far have the disadvantage that, after having reached a certain condensate viscosity, the viscosity increase per unit time continually decreases.

SUMMARY OF THE INVENTION

Polyester precondensates are catalytically polycondensed in solid phase at a constant temperature with a linear increase (during polycondensation) in intrinsic viscosity. The linear increase makes possible an accurate advance determination of reaction time required to produce thermoplastic polycondensate of any desired intrinsic viscosity.

Figure 1:
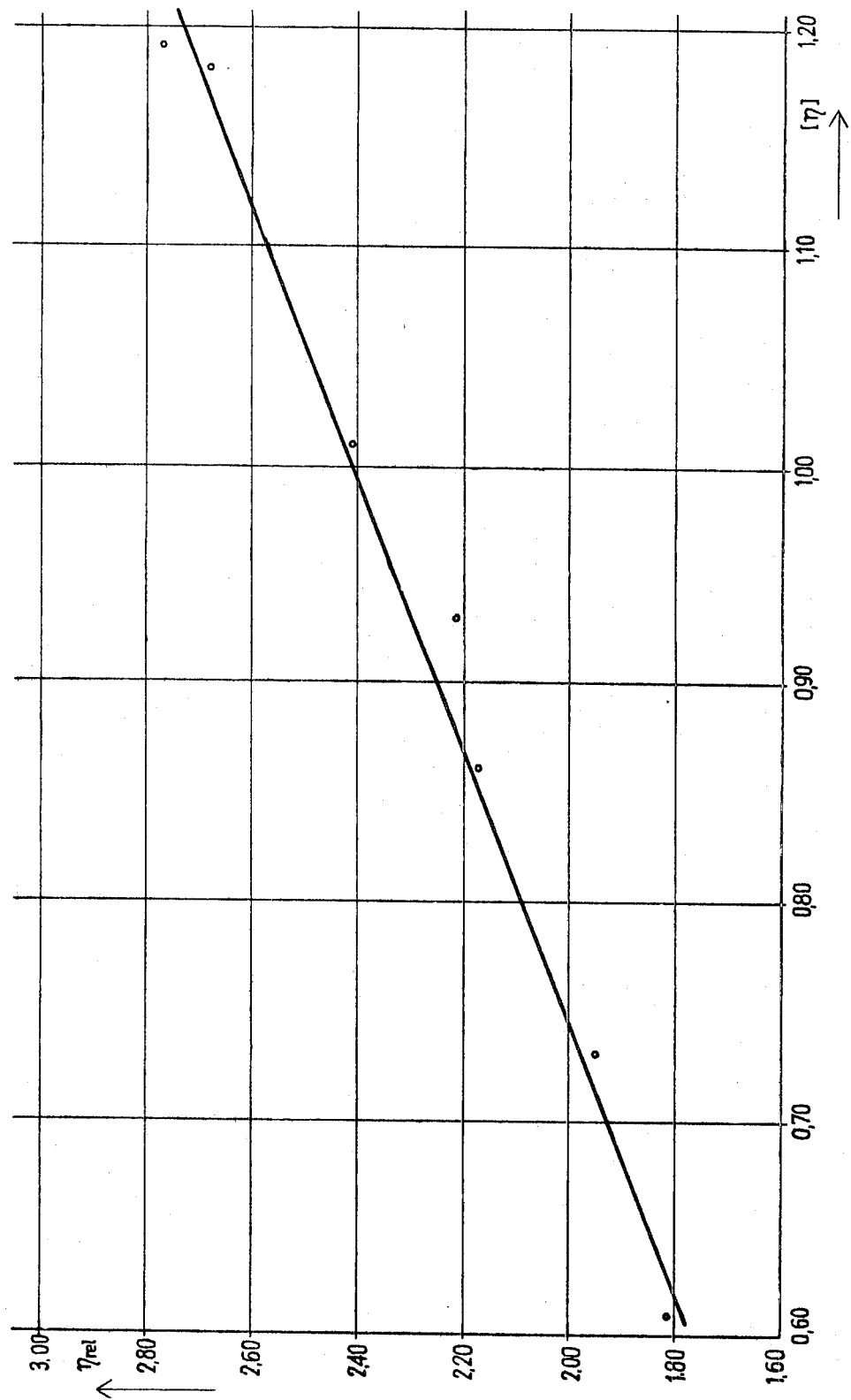
FIG. 1 is a graph of the relation between relative viscosity ($\eta$ rel) and intrinsic viscosity ($\eta$).

DETERMINATION a. Determination of the degree of crystallinity:
The degree of precondensate or polycondensate crystallinity is calculated from the determination of density;

the following relation between density and degree of crystallinity is valid, e.g., for polyethylene terephthalate:

|  | Density at 25° C | Degree of Crystallinity |
|---|---|---|
| amorphous polyethylene terephthalate | 1.330 | 0 % |
|  | 1.336 | 5 % |
|  | 1.342 | 10 % |
|  | 1.348 | 15 % |
|  | 1.354 | 20 % |
|  | 1.360 | 25 % |
|  | 1.366 | 30 % |
|  | 1.372 | 35 % |
|  | 1.378 | 40 % |
|  | 1.384 | 45 % |
|  | 1.390 | 50 % |
|  | 1.396 | 55 % |
|  | 1.402 | 60 % |
|  | 1.408 | 65 % |
|  | 1.414 | 70 % |
|  | 1.420 | 75 % |
| crystalline polyethylene terephthalate | 1.426 | 80 % |

Determination of density is effected with a density gradient column by means of two mixtures of heptane and carbon tetrachloride of different density comprising the density range between 1.330 and 1.430 g/cm$^3$. Polyethylene terephthalates of known density are used as standards. (C.f. G. M. Kline, "Analytical Chemistry of Polymers", Part III, p 43, Interscience, 1962).

b. Determination of the concentration of carboxylic groups (c.f. P. W. Allen, "Techniques of Polymer Characterization", London, Butterworths, p 218, 1959).

The concentration of carboxylic groups of the respective samples is determined by dissolving a weighed, optionally groundup, sample, in pure anhydrous benzyl alcohol, diluting with chloroform and titrating the resulting solution with N/50 NaOH in benzyl alcohol, using phenol red as indicator, according to the formula $$\text{carboxylic acid value} = \frac{20 \times \text{consumption [ml]} \times \text{mol weight}}{\text{weighed substance [g]} \times 10^6}$$

Consumption [ml] : consumption of N/50 NaOH minus the consumption of NaOH for an analogous blanket
mol weight: calculated from the equation: $[\eta]$ [dl/g] $= 4.68 \times 10^{-4} \times 2^{0.68} \times (\overline{M}_n)^{0.68}$
Reference: Louis D. Moore, Jr. American Chem. Soc. Div. Polymer Chemistry, Preprint 1, No. 1, 234 –$^{243 (1960)}$

DETAILS

Solid phase polycondensation is now possible without the disadvantages of prior art methods. For such solid phase polycondensation the starting material is a precondensate with a degree of crystallinity of at most 66.5%, e.g. from 20 to 56.5%, preferably from 33 to 58%, and with a carboxylic acid value of at most 1.4 val/mol, preferably at most 1.2 val/mol, and which contains 0.001 to 2 percent by weight of catalyst in intimate admixture therewith. The increase in intrinsic viscosity at constant polycondensation temperature follows the equation $$\frac{d[\eta]}{dt} = a$$

when the maximum degree of crystallinity of polycondensate producible from the precondensate at the polycondensation temperature during the polycondensation period does not exceed the value of 80%, preferably less than 75%. The constant a has the character of viscosity increase per unit time [dl g$^{-1}$h$^{-1}$] and has a value of at least 0.010 dl g$^{-1}$h$^{-1}$, preferably of at least 0.015, at 235° C. The particularly preferred range, however, is above 0.025 dl g$^{-1}$h$^{-1}$. In general, the increase in viscosity ranges between 0.025 and 0.040 dl g$^{-1}$h$^{-1}$. Val/mol = equivalents of carboxylic groups per mol [gram] of polyester.

The intrinsic viscosity of the polycondensate of higher viscosity obtained preferably ranges between 0.90 and 1.80 dl/g.

The above-noted physical properties are critical. When maximum values of these physical properties of the precondensate, namely: the degree of crystallinity and the carboxylic acid value of the precondensate, are exceeded, the viscosity increase at constant polycondensation temperature no longer remains constant but becomes dependent upon the intrinsic viscosity reached, and the rate of viscosity increase decreases regularly with increasing viscosity. Linear increase in viscosity also depends upon the degree of crystallinity of solid phase polycondensate. If catalysts according to the invention are used, the degree of crystallinity of the final product doesn't exceed 80 percent. This value is also critical for the process according to the invention. Other catalysts are also suitable for the process if they limit the degree of crystallinity of obtained solid phase polycondensate to at most 80 percent, preferably not above 75 percent. The critical nature of the indicated physical properties is evident from the working examples.

According to the invention the increase in viscosity per unit time of a polyester condensate in the solid phase at constant temperature depends upon precondensate properties and upon properties of the more viscous (higher molecular weight) polycondensate obtained. This increase in viscosity per unit at constant temperature is invariable; there is a linear relation between intrinsic viscosity and condensation time when the physical property data of the precondensate and the resulting condensate are below the indicated maximum values.

In starting with precondensate (produced by melt condensation according to a known method) with a maximum degree of crystallinity of 66.5%, preferably from 33 to 58%, and a carboxylic acid value of at most 1.4 val/mol, care must still be taken to avoid all steps which might increase the degree of crystallinity of this precondensate to more than 66.5% and the carboxylic acid value to above 1.4 val/mol. In this regard the surface moisture remaining after removal of melt condensate from its reaction vessel and after its quenching should be removed at temperatures as low as possible, namely: below 80° C, optionally in vacuo, over a period of several hours. Only after this pretreatment should drying be effected for several hours in vacuo at increased temperatures, preferably between 80° and 190° C. These drying conditions, above all, are required in order to prevent hydrolytic decomposition caused by water and thus forming of additional carboxylic groups. The residual moisture is to be maintained below 0.02 percent by weight. In any case, it is necessary to work under strictest exclusion of oxygen to avoid any detrimental influence. It is further necessary to exclude all those substances which could cause catalytic decomposition of the polyester. When polyester precondensate produced in a melt condensation process has the requisite physical properties with regard to degree of crystallinity and carboxylic acid value and the precondensate does not contain one of the herein-named catalysts, a presample is tested to determine whether an increase occurs in the degree of crystallinity (to more than 80%) of the solid phase polycondensate in solid phase condensation at increased temperatures.

The starting precondensate does not yield (during polycondensation) polycondensate having a degree of crystallinity above 80%; for precondensate which does yield polycondensate having a higher crystallinity, the increase in viscosity (during solid phase polycondensation) diminishes with increasing viscosity of the condensate. The suitability of precondensate for carrying out the subject process is easily determined by testing a presample.

A sample of precondensate is tempered at the desired solid phase condensation temperature over a period of time corresponding to the time of solid phase condensation, and the sample's density is determined after tempering. The degree of crystallinity can be determined from the density of the sample on the basis of the previously noted linear relation density and degree of crystallinity. If the degree of crystallinity of the tempered sample is below 80%, the precondensate tested is suitable for carrying out the process according to the invention. If the degree of crystallinity of the tempered sample is above 80%, the precondensate tested is unsuitable.

By this simple test it was found that, e.g., calcium acetate and antimony trioxide, under conditions of solid phase condensation, lead to an increase in the degree of crystallinity of polycondensate to above 80% before the desired intrinsic viscosity is reached. Such an increase in the degree of crystallinity also leads (during polycondensation) to a decrease in the viscosity increase. Therefore this catalyst system should not be used for carrying out the instant process. Evidence is provided by a comparison of Examples 1, 2, 6, 7, 8, 9, 10, 11, 12, 13, 15, 16, 18, 19, 20 and 21 with Comparative Example 4.

The present process has a whole series of advantages over prior processes without necessitating (a) an unreasonably long polycondensation time, (b) pregrinding precondensate to small grain size and (c) subsequent sifting. This not only saves additional operating procedures, but also prevents difficulties in the further processing of the solid phase condensate. Moreover, it is possible — and also economical — to start out from melt condensates with relatively high values of $[\eta]$.

Adherence to the critical physical properties assures a constant rate of viscosity increase during polycondensation even at high polycondensate viscosity. The increase in viscosity remains constant even at intrinsic viscosities between 0.90 and 1.80 dl/g. This makes prediction as to the polycondensation time (at constant polycondensation temperature) at which any certain intrinsic viscosity is reached effortless and exact. All that is required is the determination of the increase in viscosity per unit time (a), and the cumbersome "point by point" recording of a calibrating curve on viscosity and polycondensation time is obviated; it is sufficient to determine just a few points on the straight line representing intrinsic viscosity and polycondensation time. This essentially facilitates analytic control of the method of polycondensation, particularly in production batches.

A further characteristic of the process is that very high final viscosities may be attained within reasonable polycondensation times. The polycondensation time for reaching an intrinsic viscosity, e.g. 1.20 dl/g, ranges from 13 to 18 hours.

The cumbersome and problematic determination of differential thermo-analytical measurements on the precondensate and their timeconsuming evaluation may be omitted and replaced by a simple density determination if a melt condensate is used which has a number of carboxylic groups below 1.4 val/mol, preferably below 1.2 val/mol. Whether the precondensate is suitable for carrying out the process is determined by simple tempering of the precondensate and subsequent determination of the density of the tempered sample.

A further surprising technological advance is in the production of high molecular weight, easily crystallizable polyester molding masses especially suitable for the production of articles by injection molding. A particular disadvantage of prior art processes is the decrease in the rate of viscosity increase (during polycondensation) with rising viscosity. Cited examples show that solid phase condensation stops entirely once a certain viscosity is exceeded. When solid phase polycondensation produces polycondensate with crystallinity in excess of 80% within a short period of time, e.g. six hours, the polycondensation comes to a standstill at relatively low viscosities. This factor is essentially responsible for making the production of high molecular weight, easily crystallizable, molding masses by solid phase condensation a hitherto unsolved problem. A comparative example (Example 4) shows the production of a solid phase condensation batch with a degree of crystallinity of 82% and a crystallization temperature of 127° C; this batch must therefore be considered an especially easily crystallizable solid phase condensate. Solid phase condensation has come to a standstill, and it is not possible to increase the viscosity of the polycondensate after 32½ hours of solid phase condensation. In Examples 1 and 2, which are within the scope of the invention, solid phase condensation batches with a degree of crystallinity of 73 and 78%, respectively, are produced. The crystallization temperatures are 130° C and 129° C, respectively. These polycondensates represent excellently crystallizing molding masses with the additional advantage, as compared to the result of Example 4, of essentially increased viscosity (Example 1, 1.12 dl/g; Example 2, 1.32 dl/g). By this, the processor of plastics gains additional latitude by processing the easily crystallizable molding masses produced according to the process of the present invention.

The new thermoplastic polyester solid-phase polycondensate particles differ from prior art products by their uniformity in density and molecular weight. Therefore, shaped articles of very uniform properties are obtained when the new polycondensates are used. This is, for instance, highly desirable in the production of tire cord. Moreover, the new polycondensate shows high thermostability in the molten state, which ensures a high molecular weight in the end-product and, alternatively, its application allows the use of higher amounts of polyester wastes without any impairment of the properties of the final article.

The "easily crystallizable polyesters" have a crystallization temperature of less than 140° C, tested according to the following procedure: A polyester sample is heated in a Differential Scanning Calorimeter (Perkin Elmer DSC-IB) up to 300° C, tempered at this temperature for 5 minutes and then quenched rapidly in order to obtain an amorphous sample. This sample is reheated in the DSC-IB with a heating rate of 16° C/min until crystallization (which is shown by an exothermic peak on the recorder) is completed. The temperature coordinated to the maximum of said peak is the crystallization temperature.

"Polycondensation temperature" according to the process of this invention is defined as the temperature at which polycondensation in the solid state is performed.

The polycondensates (produced according to the process of the present invention and with a degree of crystallinity of less than 80%) are particularly suited for injection mold processing. When these solid phase condensates are injected by means of an injection molding machine at mold temperatures of at least 120° C, the obtained articles have excellent mechanical and electrical properties. Obtained crystalline (having a degree of crystallinity of at least 25%) injection molded articles, which are stable to impact and also possess thermal dimensional stability, are suitable for use in instrument panel parts, fittings, gaskets, springs, housings for electrical appliances and hand tools, dishes, parts for household appliances and for use in insulating panels, buttons, bearings, track wheel, cam disks, valves, cog wheels and cog shafts. Injection molding of the polycondensate is effected in the same equipment and in the same manner as for known polyester polycondensates. The resulting polyester molding masses (according to the present invention) are also useful for the extrusion of pipes, rods and profiles (also having a homogeneous crystal structure, a high degree of crystallinity and therefore high thermal dimensional stability). Since the subject process permits production of extremely high molecular weight polyethylene terephthalates, it is particularly suitable also for the production of high molecular weight polyethylene terephthalate spinning melts, such as are required for, e.g., the production of tire cord. [C.f. Example 3] Resulting spinning melts are processed into and employed as tire cord in the same manner as known counterparts.

The present process further permits production of particularly high molecular weight polyester molding masses suitable for producing amorphous articles by injection molding or for producing transparent films or foils. It has been found that polyester molding masses into which other components [structurally related to terephthalic acid (e.g. isophthalic and/or phenyl indane dicarboxylic acids) and/or structurally related to ethylene glycol and oxyalkylated multivalent phenols (e.g. bisphenol-A-diglycol ether and/or trimethyl hexane diols (1,6) and/or other alkane diols)] (either singly or in any combination) with a modifying affect are incorporated by condensation are particularly suited for this purpose. These components with a modifying effect are added (in amounts of up to 10 mol % in relation to the acid component employed) to the starting material for the production of polyester molding masses which yield amorphous articles by injection molding. The resulting polyester molding masses, e.g. the polyester molding mass of Example 6, are injected into a mold by means of an injection molding machine, the mold being kept at a temperature of less than 120° C, preferably at less than 100° C. The thus-prepared products are nearly colorless, transparent articles with excellent mechanical and electrical properties and a degree of crystallinity of less than 25%.

Such polyester molding masses may also be easily processed into transparent films and foils. Illustrative modifying components of the reaction mixture for the preparation of the precondensate are isophthalic acid, substituted isophthalic acids (e.g. 5-methyl-isophthalic acid), 1- or 2-phenylindane 4,5-, 4,6-, 4,7-or 5,6-dicarboxylic acid, oxyalkylated multivalent phenols (e.g. bisphenol-A-diglycolether), propylene glycol, butanediol-(1,4), hexamethylene glycol and 1,10-decanediol.

A comparison between the results of Examples 1 and 2 for the process according to the present invention and the results of Comparative Example 4 confirms the criticality of 80% crystallinity for the condensate.

The critical nature of precondensate carboxylic group content of more than 1.4 val/mol is evident from a comparison of Examples 5 and 3. When the carboxylic group content (acid value) of the precondensate is more than 1.4 val/mol, the course of the viscosity - condensation time relationship clearly deviates from a straight line; the increase in viscosity per unit time strongly decreases after an intrinsic viscosity of 1.04 dl/g has been reached.

According to a preferred embodiment of the invention, condensation in the melt is effected according to known methods up to an intrinsic viscosity of between 0.60 and 0.80 dl/g; the melt condensate is then granulated and any potential surface humidity present is removed by drying at temperatures of up to 80° C, preferably between room temperature and 70° C. The surface humidity present is removed when the partial pressure of the water vapor above the granules amounts to less than 1 torr. Complete drying is effected at temperatures between 130° and 190° C to a water content of at most 0.02 percent by weight. If no details regarding the crystallization behavior of these dried granules are known, a small sample is tempered at the intended solid phase condensation temperature for the intended solid phase condensation time. Subsequently, the degree of crystallinity of this sample is determined by means of a density determination. If the degree of crystallinity is below 80°, the precondensate is suitable for use in carrying out the process of the present invention. In an analogous manner, the suitability of the granules with regard to carboxylic acid value is also determined for the precondensate.

The subsequent solid phase condensation is effected at temperatures in the range of 5° to 50° C below the melting point in vacuo and/or an inert gas stream. When the granules have reached the solid phase temperature and 3 hours after this, one (each) sample is taken, and the intrinsic viscosity of these samples is determined. The obtained values are recorded in an intrinsic viscosity - time diagram and connected by a straight line. Then, the condensation time required for reaching the intrinsic viscosity of the final product is read from the diagram. When the time so determined has elapsed, the granules are cooled off and the reaction is thereby terminated.

The polycondensation catalyst is any catalyst which is useful for solid phase polycondensation of the employed precondensate as long as it does not yield under the selected polycondensation conditions a polycondensate having a crystallinity in excess of 80%.

The precondensate is a polyester melt condensate of relatively low molecular weight and intrinsic viscosity. It, like the polycondensate prepared therefrom, consists of essentially linear macromolecules. The polycondensate is thermoplastic.

By relatively low molecular weight of the precondensate a range in intrinsic viscosity from 0.4 to 1.0 dl/g is encompassed. The high molecular weight range for the solid phase polycondensate embraces a range in intrinsic viscosity from 0.9 to 1.8 dl/g.

The specific nature of the monomer which constitutes the backbone of the polyester is non-critical except for the requirement that the solid phase polycondensate be a thermoplastic with a crystallinity of at most 80%.

For carrying out the process according to the present invention, polyester precondensates based on polyethylene terephthalate are especially suitable. This means that at least 85 mol % of the acid radicals making up these precondensates should be composed of terephthalic acid radicals and at least 85 mol % of the diol radicals should be composed of ethylene glycol radicals. In addition, other aromatic dicarboxylic acids (having 1 or 2 benzene rings and 8 to 20 carbon atoms), e.g. isophthalic, naphthalene-(2,6)-dicarboxylic and diphenyldicarboxylic acid, and minor amounts or aliphatic dicarboxylic acids having from 4 to 10 carbon atoms, e.g. adipic, sebacic and azelaic acid, may be incorporated in the reaction mixture for preparing the precondensate. Other diol components include unbranched alkane diols containing from 2 to 10 carbon atoms, diethylene glycol and cyclic diols, e.g. 1,4-bis-(hydroxymethyl)cyclohexane and 2,2-bis-(4'-$\beta$-hydroxyethoxyphenyl)propane. When using an acid component other than terephthalic acid and/or a diol component other than ethylene glycol, the process must be based on a different relation (determined for each individual case of application) between density and degree of crystallinity. The melt condensate used according to the present invention can also contain 0.001 to 1 mol % of radicals of more than divalent carboxylic acids or alcohols, e.g. glycerine, erythritol, pentaerythritol, tricarballylic acid, trimellitic acid or pyromellitic acid.

The intrinsic viscosity of the condensates of the Examples is determined in 1% solutions of phenol:tetrachloroethane at 30° C. The diagram in FIG. 1 shows the relation between the relative viscosity of a solution of 1% polyethylene terephthalate in dichloroacetic acid at 25° C and the intrinsic viscosity of a solution of 1% polyethylene terephthalate in phenol:tetrachloroethane (1:1 per weight) at 30° C.

A number of catalyst systems are particularly good for carrying out solid phase condensation; melt precondensates produced with these catalysts not only have a low carboxylic acid value and a degree of crystallinity of between 20 and 66.5%, but they yield (in the course of solid phase condensation) solid phase polycondensates having intrinsic viscosities of up to 1.80 dl/g and a degree of crystallinity which does not exceed 80%. In addition, the solid phase condensate shows very little coloring of its own. Such catalyst systems are described in Examples 1 to 3 and 6 to 22 of the present application. If, e.g., a catalyst system containing manganese is used, a stabilizer, such as triphenyl phosphite, is added (c.f. Examples 3, 15 and 22). The stabilizer is not essential, but obtained solid phase condensate has a certain amount of coloring of its own when an unstabilized manganese-containing polycondensation catalyst system is used.

A melt condensate containing catalytic amounts of a catalyst combination consisting of antimony, lead and calcium very quickly reacts (when carrying out solid phase condensation) to form a higher molecular weight polycondensate which is nearly colorless. Contrary to other solid phase polycondensates containing (in addition to antimony) components, such as manganese, the solid phase condensates containing a) antimony, b) lead and c) calcium display only very minor chromatic aberrations from white. Aside from the external optical impression, this is evident from colorimetric measurements taken with the trichromatic colorimeter on polyester samples (Example 23 and Comparative Example 24).

The subject process, however, is in no way limited to the use of catalyst combinations consisting of a) antimony, b) lead and c) calcium. Producing a melt precondensate, catalysts can be employed as mixtures of metals or as alloys, as solutions of metals in ethylene glycol or as oxides or as salts from low molecular weight carboxylic acids. The catalyst is ordinarily employed in amounts of from 0.001 to 2 percent by weight of polyester precondensate with which it is preferably in intimate admixture. The subject process is in no way limited to catalyst combinations consisting of antimony, lead and calcium; alternative suitable catalyst systems, e.g., consist of:

a. antimony, lead and zinc,
b. antimony, lead and manganese,
c. antimony, lead, calcium and manganese,
d. antimony, lead, calcium and zinc,
e. antimony and zinc,
f. antimony, lead and lithium,
g. antimony and manganese,
h. titanium and calcium,
i. polymeric germanium hydride and calcium,
j. polymeric germanium hydride and zinc, and
k. potassium germanide.

An exemplary use of such a system for producing a melt condensate is described in DDR Pat. No. 69,700.

A melt condensate for carrying out solid phase condensation which is particularly suitable contains up to 0.05 percent by weight of antimony, up to 0.02 percent by weight of lead and between 0.005 and 0.1 percent by weight of calcium. The three metals mentioned surprisingly have a synergistic effect on each other; lead alone yields strongly colored solid phase condensates, and the combination of antimony trioxide and calcium acetate yields molecular weights which are inadequate for many types of application (Example 4).

In carrying out the process, the melt condensate is heated to temperatures of 5° to 50° C below the melting point of the precondensate. The process can be carried out in many different variants, e.g. in vacuo, under atmospheric pressure, under an inert gas atmosphere, or in vacuo with an inert gas stream being conducted through a bed containing the melt condensate. There are also various possibilities as to technology and apparatuses employed to realize the process: the melt condensate may be granulated, pulverized or subjected to condensation in the form of films, in dryers, rotary tubular kilns an all devices permitting both a mechanical motion of the material and the removal of low molecular weight volatile alcohols escaping during polycondensation. When removal of volatile substances is carried out in an inert gas stream, the use of (technically) easily available and less expensive gases, such as nitrogen, carbon dioxide, propane, combustion gases, exhaust gases or natural gas, is preferred; it is also possible, however, to employ gases, such as hydrogen and helium, but (for practical reasons) the latter gases are ordinarily recirculated after separation of the alcohol components. Care must be taken in carrying out the process that neither the precondensate, any substance with which the precondensate comes into contact, the reaction vessel, nor the inert gas conducted through the reaction bed contains traces of water. Under no circumstances is the water content of the material to be condensed to exceed 0.02 percent by weight. Although polycondensation takes place when using air, especially at short polycondensation times with catalysts according to the present invention, avoiding the presence of oxygen is recommended; otherwise, particularly at longer polycondensation times, marked discoloration and an increase in the number of carboxylic groups in the solid phase condensate are obtained. When solid phase condensate is processed in the form of granules, a granular size of between 2 and 4 mm is recommended. When melt condensate (removed from the melt condensation vessel) is quenched in an aqueous medium, the adhering surface moisture is removed by drying in vacuo for several hours at temperatures below the glass transition temperature of the melt condensate. Complete drying is also effected in vacuo at temperatures of between 100° and 190° C over a period of several hours. The precondensate charge for the solid phase condensation must have a moisture content of less than 0.02 percent by weight.

According to a further preferred embodiment of the invention, solid dry melt condensate is charged into a reaction vessel in cut-up form or in the form of granules or films, the reaction vessel being provided with inlet and outlet openings, a vacuum connection, a feeder pipe and a heater. After charging the melt condensate, a vacuum is applied, the melt condensate is subjected to mechanical motion, e.g. stirring, and the reaction vessel is heated; the air in the reaction vessel is concurrently replaced by an inert gas. The inert gas pressure is kept at less than 1 mm/Hg; however, the condensate is maintained in steady contact with fresh gas.

Once a polyester melt condensate of an intrinsic viscosity of between 0.4 and 1.0 dl/g is removed, it is usually cut to a uniform size in order to keep the diffusion paths (of the volatile alcohol components escaping during solid phase condensation) as uniform as possible for all particles of the condensate. The cut and usually uniformly shaped melt condensate is then normally present in the form of chips, cubes or cylinders, spheres, tablets or platelets, foil flakes or in fibrous form. Preferred dimensions in one direction are 0.5 to 5 mm. Below a practical minimum particle size the particles are packed too tightly and volatilization of alcohols which are gaseous under reaction conditions is greatly impaired.

The condensate particles are placed in a reaction vessel and kept there under constant motion either by rotation of the reaction vessel (e.g. tumble dryer or rotary tube) or any other desired motion of the reaction vessel (e.g. vibrating motion) or by a mechanical rotary device within the reaction vessel (e.g. stirring). It is also possible to charge the melt condensate into the reaction vessel while moisture still adheres to it, in which case the reaction vessel also serves as a dryer. Care must be taken to remove the surface moisture of the melt condensate in vacuo at temperatures below the glass transition temperature of the melt condensate in order to prevent hydrolytic decomposition.

Drying is subsequently completed in vacuo at temperatures of up to 200° C. Inert gas may be conducted in at this time. After complete drying (the water content should be below 0.02 percent by weight) of the precondensate, solid phase condensation can be carried out under constant mechanical motion of the precondensate particles in contact with streaming inert gas at a pressure of less than 1 torr, e.g. from 0.01 to 1 torr, mercury at a temperature of from 50° to 5° C below the melting point of the condensate. By contact with a constantly regenerated gas stream, diffusion and carrying off of the volatile components is considerably accelerated, whereby the reaction rate of the solid phase condensation is increased. This is demonstrated in Example 25. The inert gas streaming rate is less than 2 liters per hour and per kilogram of solid phase condensate. It is usually kept between 0.05 and 1 liter per hour and per kilogram of solid phase condensate. Inert gases suitable for this purpose are nitrogen, carbon dioxide or industrial waste gases. It is also possible to use rare gases, such as helium or argon. The inert gas may be conducted through the reaction bed, but in many cases, it suffices to let the inert gas stream over the reaction bed.

The preferred reaction vessel is an adapted vacuum dryer, e.g. a tumble dryer. Adaptation, according to a specific embodiment, consists of a lance-shaped inlet pipe introduced through the hollow axle of the vacuum dryer, with the outlet opening for the inert gas being located near the bottom of the vacuum dryer. By this, effective streaming through the reaction bed is achieved. Depending upon the size and embodiment of the dryer, it is also possible to provide it with several outlet openings (nozzles).

In a vacuum dryer with a stationary housing the inlet pipe may be placed in the bottom or the inert gas may be introduced into its reaction chamber through holes in its casing.

In a vacuum dryer thus equipped, the precondensate is first dried in vacuo and crystallized by heating to temperatures of up to 200° C, at which time inert gas can already be introduced. The precondensate is then brought to the desired reaction temperature under introduction of inert gas, and the reaction is continued until the desired degree of polycondensation is reached.

EXAMPLE 1

112 grams (g) of a pulverized lead antimony alloy (Pb:Sb = 3:7) sifted to a granular size of 40 microns ($\mu$) and suspended in 500 milliliters (ml) of ethylene glycol and 160 kilograms (kg) of dimethyl terephthalate are added to 86 liters (l) of ethylene glycol. Then, 80 g of calcium dissolved in 15 l of ethylene glycol are added. Methanol distillation sets in at 105° C and the methanol formed is distilled off by means of a packed column with adjustable runback, the temperature in the reaction mixture rises to 201° C.

The thus-obtained ester interchange mixture is pressed through a filter with a mesh size of 40 $\mu$ into a second reactor and there is heated to 275° C. After distilling off the excess ethylene glycol, a vacuum of 0.5 torr is applied within 2 hours. After a further 3½ hours, an intrinsic viscosity of 0.75 deciliter/gram (dl/g) is reached. The reaction is then stopped and (after quenching in water) the obtained precondensate is cut into granules of approximately cylindrical shape of 3 millimeters (mm) length and about 2.5 mm diameter.

Figure 1A:
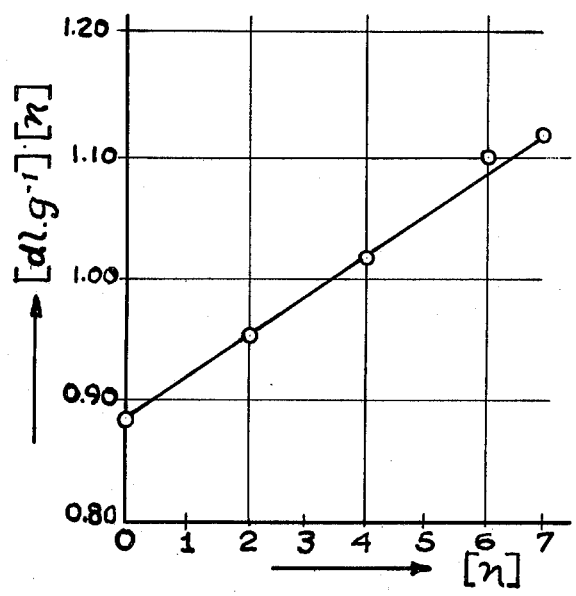

400 kg of the so-obtained precondensate are predried in a tumble dryer of 1 cubic meter ($m^3$) capacity for 3 hours at 50° C under a vacuum of 0.3 torr. The granules are then heated at constant vacuum within 5 hours to 175° C and kept at this temperature for 2½ hours. The density of these granules is 1.383 gram/cubic centimeter ($g/cm^3$), the concentration of carboxylic end groups is 0.83 val/mol ($[\eta] = 0.75$). The temperature of the granules is then increased to 236° C within 6 hours at still constant vacuum. A sample taken now shows an intrinsic viscosity of 0.89 dl/g. The granules are now kept for 7 hours at 236° ± 0.5° C, with samples being taken at 2 hour intervals and the intrinsic viscosity of the samples being determined. The final product has an intrinsic viscosity of 1.12 dl/g and a density of 1.416 g/cm³. The course of the solid phase condensation is shown by FIG. 1a in which $a = 0.033$ [dl g$^{-1}$h$^{-1}$] and wherein the intrinsic viscosity is plotted against the polycondensation time in hours.

EXAMPLE 2

Figure 2:
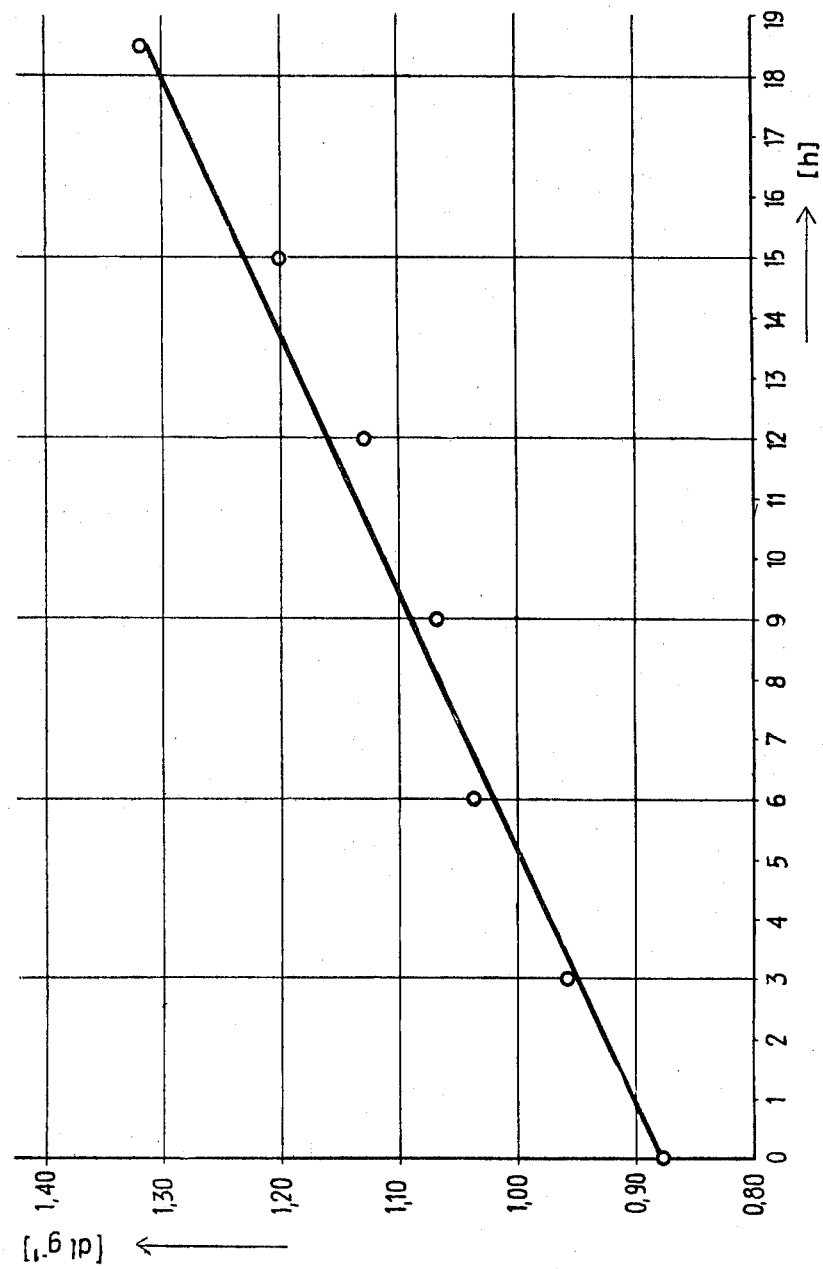
FIGS. 1a, 2 and 3 are plots showing the linear relation between intrinsic viscosity and polycondensation time.

140 kg of a precondensate obtained according to the process described in Example 1 are dried in a tumble dryer of 1 cubic meter capacity for 3 hours at 50° C under a vacuum of 0.3 torr. The granules are subsequently heated within 4 hours to 175° C at constant vacuum and kept for 3 hours at this temperature. The density of these granules is 1.385 g/cm³, the concentration of carboxylic end groups is 0.79 val/mol ($[\eta] = 0.75$). The temperature of the granules is then raised at still constant vacuum within 4 hours to 236° C. A sample drawn now shows an intrinsic viscosity of 0.88 dl/g. The granules are now kept for 18½ hours at 236° ± 0.5° C, with samples being taken at 3 hour intervals in order to determine the intrinsic viscosity. The final product has an intrinsic viscosity of 1.32 dl/g and a density of 1.418 g/cm³. The linear course of the solid phase condensation is shown by means of FIG. 2, $a = 0.024$ [dl g$^{-1}$h$^{-1}$], wherein the intrinsic viscosity if plotted against the polycondensation time in hours.

EXAMPLE 3

56.8 g of manganese acetate are added to 101 l of ethylene glycol and 160 kg of dimethyl terephthalate. Methanol distillation sets in at 130° C, and the methanol formed is distilled off by means of a packed column with adjustable runback. 66 l of methanol are distilled off within 3½ hours, the temperature in the reaction mixture rises to 202° C. At the end of the ester interchange, 80 g of triphenyl phosphite are added.

Figure 3:
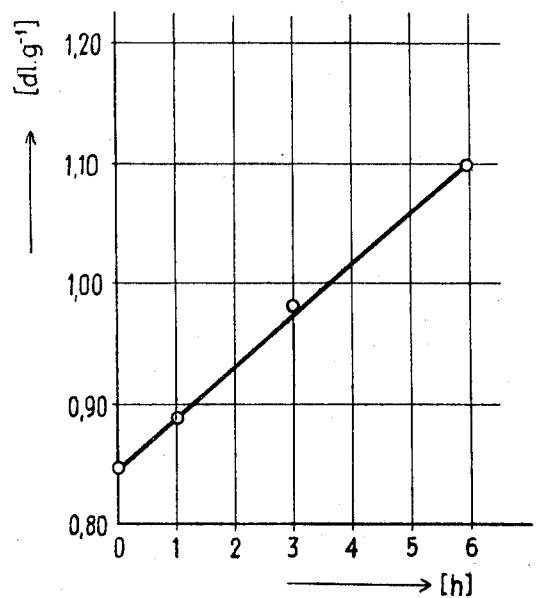

The ester interchange mixture so obtained is pressed into a second reaction vessel and heated to 275° C after addition of 57.6 g of antimony trioxide dissolved in 500 ml of ethylene glycol. After distilling off the excess ethylene glycol, a vacuum of 0.5 torr is applied within 2 hours. After a further 3-hour period, an intrinsic viscosity of 0.71 dl/g is reached. The reaction is stopped and the obtained precondensate is quenched in water and then cut into granules of approximately cylindrical shape of about 3 mm length and about 1.5 mm diameter. 400 kg of the thus-obtained precondensate are dried in a tumble dryer of 1 cubic meter capacity for 3 hours at 50° C under a vacuum of 0.1 torr. The granules are then heated at still constant vacuum within 5 hours to 175° C, and kept at this temperature for 2½ hours. The density of these granules is 1.378 g/cm³, the concentration of carboxylic end groups is 0.66 val/mol ($[\eta] = 0.71$). The temperature of the granules is then increased at still constant vacuum within 6 hours to 236° C. A sample now taken shows an intrinsic viscosity of 0.85 dl/g. The granules are then kept for 6 hours at 233° ± 0.5° C, with a sample being taken at various intervals in order to determine the intrinsic viscosity. The final product has an intrinsic viscosity of 1.10 dl/g and a density of 1.418 g/cm³. The linear course of solid phase condensation is evident from FIG. 3, $a = 0.035$ [dl g$^{-1}$h$^{-1}$] wherein the intrinsic viscosity is plotted against the polycondensation time in hours.

The polymer is melt spun at a temperature of 295° C through two 100-hole spinnerets at a spinning speed of 400 meters per minute to give a spun yarn having a total denier of approximately 1000, which is wound up on a bobbin. This bobbin is put on a draw-machine and the spun yarn passed to a pair of heated feed rolls maintained at a temperature of 95° C and rotating at a surface speed of 50 meters per minute. The yarn is then passed over a heated block maintained at a surface temperature of 190° C and around a pair of heated draw rolls maintained at 210° C and operating at a surface speed of 300 meters per minute. The yarn is wound up on a bobbin. When tested on an Instron testing machine, the yarn is found to have a tenacity of 9.5 grams per denier, a break elongation of 11% and an initial modulus of 135 grams per denier. The yarn is found to be composed of polymer having an intrinsic viscosity of 0.90 dl/g, a melting point of 260° C and a concentration of free carboxyl groups of 0.45 val/mol. This yarn provides an excellent tire cord.

EXAMPLE 4 (comparative Example)

208 g of calcium acetate and 48 g of antimony trioxide are added to 101 l of ethylene glycol and 160 kg of dimethyl terephthalate. Methanol distillation sets in at 125° C and the methanol formed is distilled off by means of a packed column with adjustable runback. 66 l of methanol are distilled off within 3 hours, and the temperature of the reaction mixture rises to 202° C.

The ester interchange mixture thus obtained is pressed into a second reactor and heated to 275° C. After distilling off the excess ethylene glycol, a vacuum of 0.5 torr is applied within 2 hours. After a further 2-hour period, an intrinsic viscosity of 0.60 dl/g is reached. The reaction is then stopped and, after quenching in water, the precondensate obtained is cut into granules of approximately cylindrical shape of about 3 mm length and about 2.5 mm diameter.

Figure 4:
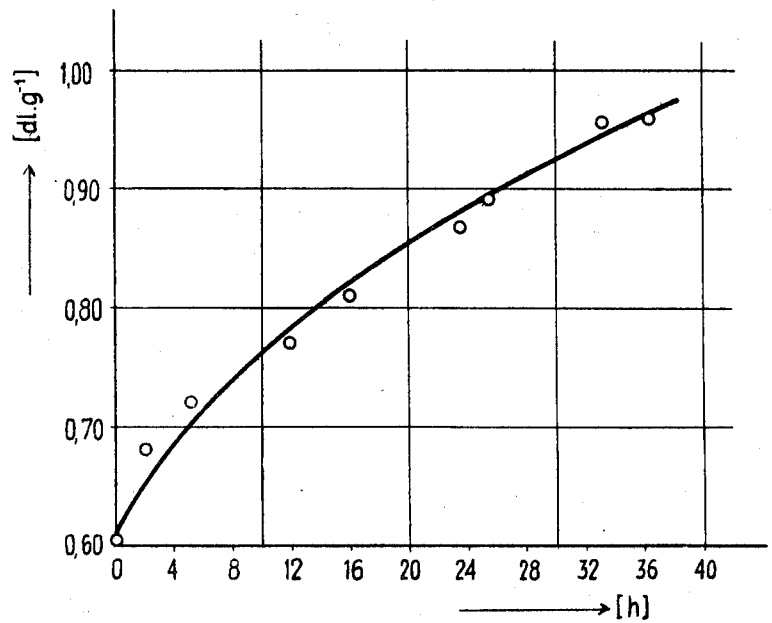
FIGS. 4 and 5 are plots showing non-linear intrinsic viscosity increase during solid phase polycondensation.

50 kg of the precondensate thus obtained are predried in a tumble dryer of 1 cubic meter capacity for 3 hours at 50° under a vacuum of 0.3 torr. The granules are then heated at still constant vacuum within 3 hours to 175° and kept at this temperature for 3 hours. The density of these granules is 1.398 g/cm³, the carboxylic acid value is 0.89 val/mol ($[\eta] = 0.60$). The density (after cooling off) of a sample tempered for 6 hours at 236° C is 1.429 g/cm³. The temperature of the granules is then increased at still constant vacuum within 4 hours to 236° C. A sample now taken shows an intrinsic viscosity of 0.62 dl/g. The granules are now kept at 236° ± 0.5° C for 36½ hours with samples being taken at various intervals to determine the intrinsic viscosity. The final product has an intrinsic viscosity of 0.96 dl/g and a density of 1.428 g/cm³. The non-linear course of the solid phase condensation and its coming to a standstill are evident from FIG. 4 in which the intrinsic viscosity is plotted against the polycondensation time in hours.

EXAMPLE 5

A precondensate is produced in analogy to Example 3, using 2.62 g of zinc acetate, 1.4 g antimony trioxide, 3880 g dimethylterephthalate, 2840 g ethylene glycol and no triphenyl phosphite. In melt condensation, an intrinsic viscosity of 0.60 dl/g is reached after 2½ hours at 0.5 torr.

Figure 5:
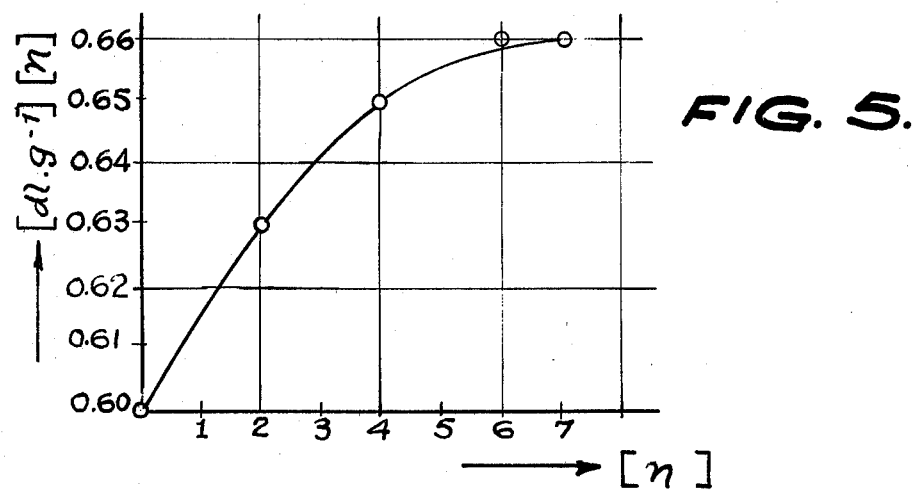

Solid phase condensation is also carried out in analogy to Example 3; granules (after drying) with a carboxylic acid value of 1.68 val/mol and a density of 1.364 g/cm³ result. FIG. 5, in which the intrinsic viscosity is plotted against the polycondensation time in hours, shows the non-linear course of the solid phase condensation (2 hours-0.63 dl/g; 4 hours-0.65 dl/g; 7 hours-0.66 dl/g). The resulting polycondensate has an intrinsic viscosity of 0.66 dl/g and a density of 1.390.

EXAMPLES 6 to 22

Precondensates were produced in analogy to Example 1, with the ester interchange time, the catalyst concentration and the ratio between the starting products and the polycondensation temperature being varied in order to show that these parameters exert no influence on the straight linear course of the reaction of solid phase condensation. The same applies to various drying temperatures prior to solid phase condensation.

| Example Number | ester interchange time in h | ester interchange catalyst | polycondensation catalyst | other additions | ethylene glycol dimethyl terephthalate | polycondensation temperature in °C |
|---|---|---|---|---|---|---|
| 6 | 4 | 0.04 % calcium dissolved in glycol | 0.07 % Sb/Pb alloy (7:3) | 5 mol % 2,2-bis-[4-(β-hydroxyethoxyphenyl)-propane] | 2.2 | 275 |
| 7 | 4 | 0.04 % calcium dissolved in glycol | 0.07 % Sb/Pb alloy (7:3) | | 2.0 | 275 |
| 8 | 4 | 0.05 % calcium dissolved in glycol | 0.07 % Sb/Pb alloy (7:3) | | 2.2 | 275 |
| 9 | 4 | 0.04 % calcium dissolved in glycol | 0.07 % Sb/Pb alloy (7:3) | | 2.2 | 275 |
| 10 | 4 | 0.02 % calcium dissolved in glycol | 0.09 % Sb/Pb alloy (7:3) | | 1.83 | 275 |
| 11 | 4 | 0.02 % calcium dissolved in glycol | 0.05 % Sb/Pb alloy (7:3) | | 1.83 | 275 |
| 12 | 4 | 0.06 % calcium dissolved in glycol | 0.05 % Sb/Pb alloy (7:3) | | 1.83 | 275 |
| 13 | 4 | 0.02 % calcium dissolved in glycol | 0.09 % Sb/Pb alloy (7:3) | | 2.33 | 275 |
| 14 | 4 | 0.008 % manganese in acetate form | 0.03 % antimony in oxide form | 0.05 % triphenyl phosphite | 2.2 | 275 |
| 15 | 4 | 0.005 % manganese 0.005 % calcium dissolved in glycol | 0.07 % Sb/Pb alloy (7:3) | 0.04 % triphenyl phosphite | 2.2 | 275 |
| 16 | 4 | 0.005 % zinc 0.005 % calcium dissolved in glycol | 0.07 % Sb/Pb alloy (7:3) | | 2.2 | 275 |
| 17 | 4 | 0.008 % manganese | 0.07 % Sb/Pb alloy (7:3) | | 2.2 | 275 |
| 18 | 4 | 0.02 % calcium dissolved in glycol | 0.03 % pulverized titanium | | 2.2 | 275 |
| 19 | 4 | 0.04 % calcium dissolved in glycol | 0.03 % polymeric germanium hydride)* | | 2.2 | 275 |
| 20 | 4 | 0.05 % potassium germanide | | | 2.2 | 275 |
| 21 | 4 | 0.04 % lithium dissolved in glycol | 0.07 % Sb/Pb alloy (7:3) | | 2.2 | 275 |
| 22 | 4 | 0.008 % zinc | 0.03 % polymeric germanium hydride)* | 0.04 % triphenyl phosphite | 2.2 | 275 |

)*produced according to I. E. Drake, J. Chem. Soc. (London) 1962, 2807.

| Example Number | drying temperature (°C) | solid phase condensation starting granules (COOH) val/mol | solid phase condensation starting granules density (g/cm³) | solid phase condensation starting granules viscosity [η] dl/g | solid phase condensation temperature (°C) | solid phase condensation course [η] after hours 0 | 2 | 5 | 7 | final product density (g/cm³) | final product [η] (dl/g) |
| --- | --- | --- | --- | --- | --- | --- | --- | --- | --- | --- | --- |
| 6 | 175 | 0.65 | 1.371 | 0.88 | 222 | 0.88 | 0.94 | 1.03 | 1.10 | 1.389 | 1.10 (6 hours) |
| 7 | 175 | 0.73 | 1.384 | 0.76 | 236 | 0.87 | 0.93 | 1.03 | | 1.416 | 1.06 (6 hours) |
| 8 | 180 | 0.82 | 1.386 | 0.74 | 236 | 0.88 | 0.94 | 1.02 | 1.07 | 1.416 | 1.07 (7 hours) |
| 9 | 175 | 0.82 | 1.384 | 0.75 | 236 | 0.90 | 0.97 | 1.06 | | 1.416 | 1.10 (6¼ hours) |
| 10 | 175 | 0.91 | 1.380 | 0.77 | 237 | 0.90 | 0.97 | 1.06 | | 1.414 | 1.07 (5¼ hours) |
| 11 | 175 | 0.79 | 1.384 | 0.75 | 236 | 0.91 | 0.99 | 1.08 | | 1.412 | 1.08 (5 hours) |
| 12 | 175 | 0.98 | 1.385 | 0.75 | 236 | 0.89 | 0.94 | 1.03 | 1.08 | 1.414 | 1.08 (7 hours) |
| 13 | 175 | 0.85 | 1.384 | 0.75 | 235 | 0.87 | 0.93 | 1.04 | | 1.412 | 1.07 (6 hours) |
| 14 | 175 | 0.71 | 1.380 | 0.71 | 236 | 0.77 | 0.81 | 0.89 | 0.92 | 1.419 | 1.09 (18½ hours) |
| 15 | 175 | 0.93 | 1.379 | 0.67 | 232 | 0.87 | 0.90 | 0.95 | 0.99 | 1.420 | 1.08 (11 hours) |
| 16 | 175 | 0.91 | 1.383 | 0.67 | 230 | 0.86 | 0.90 | 0.97 | 1.02 | 1.418 | 1.09 (10 hours) |
| 17 | 175 | 0.89 | 1.381 | 0.68 | 229 | 0.87 | 0.91 | 0.96 | 0.99 | 1.416 | 1.07 (12 hours) |
| 18 | 170 | 0.82 | 1.382 | 0.78 | 230 | 0.78 | 0.82 | 0.89 | 0.93 | 1.417 | 1.15 (18 hours) |
| 19 | 175 | 0.73 | 1.384 | 0.70 | 230 | 0.85 | 0.88 | 0.93 | 0.97 | 1.412 | 1.07 (12 hours) |
| 20 | 175 | 0.78 | 1.380 | 0.75 | 232 | 0.85 | 0.89 | 0.95 | 1.00 | 1.415 | 1.08 (10 hours) |
| 21 | 175 | 0.81 | 1.382 | 0.71 | 232 | 0.83 | 0.88 | 0.96 | 1.01 | 1.415 | 1.10 (11 hours) |
| 22 | 175 | 0.90 | 1.380 | 0.70 | 232 | 0.85 | 0.88 | 0.93 | 0.97 | 1.416 | 1.06 (12 hours) |

EXAMPLE 23

112 of a pulverized lead-antimony alloy (Pb:Sb = 3:7) sifted to 40 μ and suspended in 500 ml of ethylene glycol and 160 kg of dimethyl terephthalate are added to 86 l of ethylene glycol. Then, 80 g of calcium dissolved in 15 l of ethylene glycol are added. Methanol distillation sets in at 105° C, and the methanol formed is distilled off by means of a packed column with adjustable runback. In the course of 4 hours, 66 l of methanol are distilled off and the temperature within the reaction mixture rises to 201° C.

The thus-obtained ester interchange mixture is pressed into a second reaction vessel through a filter with a mesh size of 40 μ and there heated to 275° C. After distilling off the excess ethylene glycol, a vacuum of 0.5 torr is applied within 2 hours. After a further 3½ hours, an intrinsic viscosity of 0.75 dl/g is reached. The reaction is then stopped and the thus-obtained precondensate is quenched in water and then cut into granules of approximately cylindrical shape of about 3 mm length and about 2.5 mm diameter.

120 kg of the resulting precondensate are predried in a tumble dryer of 1 cubic meter capacity for 3 hours at 50° C under a vacuum of 0.3 torr. The granules are subsequently heated at still constant vacuum within 4 hours to 175° C and kept at this temperature for 4 hours. The temperature of the granules is then increased within 4 hours to 234° C at still constant vacuum. A sample now taken shows an intrinsic viscosity of 0.89 dl/g. The granules are now kept for 7 hours at 234° ± 0.5° C, with samples being taken at 1 hour intervals in order to determine the intrinsic viscosity. The results are evident from the following table:

| solid phase condensation time in hours | [η] (dl/g) |
| --- | --- |
| 0 | 0.89 |
| 1 | 0.90 |
| 2 | 0.96 |
| 3 | 0.99 |
| 4 | 1.01 |
| 5 | 1.04 |
| 6 | 1.08 |
| 7 | 1.11 |

Colorimetric examination of the granules thus obtained yielded the following results:

$x = 0.318$ *);

$z = 0.355$;

$Y = 80.17$ (maximum 100) degree of whiteness: 73.59 (theoretical maximum: 100)

*) white corresponds to $x = 0.333$; $z = 0.333$

Colorimetric examination was carried out on the basis of the Zeiss Publication 50-669-d, according to the trichromatic process, by means of the Zeiss Elrepho device. The CIE System serves as a reference to this.

Prior to colorimetric examination, the granules produced by solid phase condensation are sifted to a granular size of 0.64 mm² (20 Mesh). The device is then adjusted to a standard of white related to MgO and the sample is charged into the test cup in a layer of about 1 cm interposing the filters FMX/C, TMY/C and FMZ/C. By calculation, the colorimetric values of X, Y and Z, in relation to the standard light type C, are arrived at, in which Y at the same time represents the degree of brightness. By further calculation, the chromaticity coordinates $x$, $y$ and $z$ are arrived at. The whiteness is the directional reflectance of the sample determined by means of the filter R 457.

EXAMPLE 24 (COMPARATIVE EXAMPLE TO EXAMPLE 23)

86 l of ethylene glycol, 160 kg of dimethylterephthalate, 66 g of manganese acetate and 824 g of antimony trioxide are heated together. Methanol distillation sets in at 135° C. The methanol formed is distilled off by means of a packed column with adjustable runback. 66 l of methanol are distilled off within 4 hours; the temperature within the reaction mixture rises to 201° C.

The ester interchange mixture thus obtained is pressed into a second reaction vessel and there heated to 275° C. After distilling off the excess ethylene glycol, a vacuum of 0.5 torr is applied within 2 hours. After a further 2-hour period, an intrinsic viscosity of 0.69 dl/g is reached. The reaction is then stopped and, after quenching in water, the precondensate thus obtained is cut into granules of approximately cylindrical shape of about 3 mm length and about 2.5 mm diameter.

120 kg of the precondensate thus obtained are pre-dried in a tumble dryer of 1 cubic meter capacity for 3 hours at 50° C under a vacuum of 0.3 torr. The granules are then heated at still constant vacuum within 5 hours to 234° C. A sample taken now shows an intrinsic viscosity of 0.73 dl/g. The granules are now kept for 12 hours at 234° ± 0.5° C, with samples being taken at 2-hour intervals in order to determine the intrinsic viscosity. The results are evident from the following table:

| solid phase condensation time in hours | $[\eta]$ (dl/g) |
|---|---|
| 2 | 0.78 |
| 4 | 0.82 |
| 6 | 0.86 |
| 8 | 0.89 |
| 12 | 0.95 |

The tristimulus values of the granules thus obtained were $x = 0.552;$ $z = 0.217;$ $Y = 24.27.$

EXAMPLE 25

112 g of a pulverized lead-antimony alloy (Pb:Sb = 3:7) sifted to a granular size of 40 μ and suspended in 500 ml of ethylene glycol and 160 kg of dimethyl terephthalate are added to 86 l of ethylene glycol. Then 80 g of calcium dissolved in 15 l of ethylene glycol are added. Methanol distillation sets in at 106° C. The methanol formed is distilled off by means of a packed column with adjustable runback. In the course of 4 hours, 66 l of methanol are distilled off; the temperature within the reaction mixture rises to 202° C.

The thus-obtained ester interchange mixture is pressed into a second reaction vessel through a filter with a mesh size of 40 μ and there heated to 275° C. After distilling off the excess ethylene glycol, a vacuum of 0.5 torr is applied within 2 hours. After a further 5½ hours, an intrinsic viscosity of 0.75 is reached. The reaction is then stopped and, after quenching in water, the obtained precondensate is cut into granules of approximately cylindrical shape (about 3 mm length and about 2.5 mm diameter).

Figure 6:
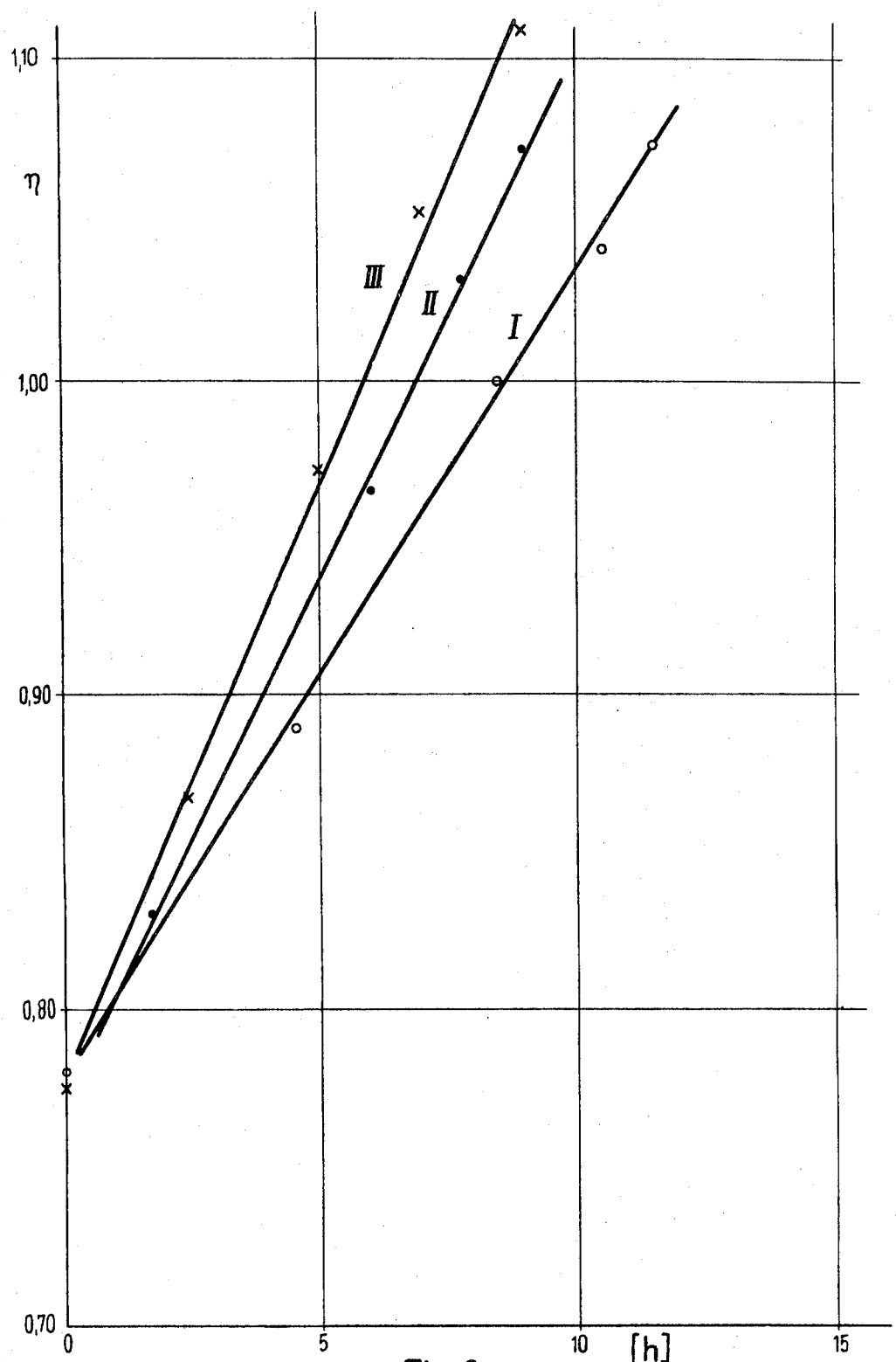
FIG. 6 is a graph showing the affect of streaming nitrogen on polycondensation rate.

400 kg of the thus-obtained precondensate are pre-dried for 3 hours under a vacuum of 0.3 torr in a tumble dryer (provided with a hollow lance protruding far into the interior with nitrogen connection and a 1 mm nozzle in its head) of 1 cubic meter capacity. The granules are then heated at still constant vacuum within 5 hours at 175° C. Then, at still constant vacuum and under introduction of nitrogen in an amount of 0 liters (straight line I in FIG. 6), 0.25 l (straight line II in FIG. 6) or 1 liter (straight line III in FIG. 6) per hour and per kg of precondensate, the temperature of the granules is raised within 6 hours to 235° C. The granules are now kept for several hours at 235° ± 0.5° C, with samples being taken from time to time in order to determine the intrinsic viscosity. The results of these determinations are graphically represented in FIG. 6 which shows the increase in polycondensation rate $a = (d\,[\eta])/dt$ in relation to gas streaming rate in [l/kg hour], the value of the intrinsic viscosity in dl/g having been determined by means of 1% solution of 1:1 phenol:tetrachloroethane at 30° C.

Throughout the disclosure all parts and percentages are by weight unless otherwise indicated. The invention and its advantages are apparent from the preceding description and that provided by parent application Ser. No. 192,049 (filed October 26th, 1971), which is incorporated herein by reference. Various changes may be made in the process and resulting products without departing from the spirit or scope of the invention or sacrificing its material advantages, the process and products hereinbefore described being merely illustrative of preferred embodiments.

What is claimed is:

1. A process for solid-phase polycondensation of an intimate admixture of a catalytic amount of polyester-polycondensation catalyst with polyester precondensate, which has
   a. a maximum degree of crystallinity of 66.5 percent and
   b. a maximum moisture content of 0.02 percent by weight, under solid-phase polycondensation conditions which comprise an essentially constant temperature of from 5° to 50° C below the melting point of said precondensate and under vacuum, under streaming inert gas or under vacuum and streaming inert gas, the process being characterized by polycondensing said intimate admixture, having a maximum carboxylic acid value of 1.4 equivalents per gram mol, for a period sufficient to yield, at an essentially constant rate of increasing viscosity, a high-molecular-weight polycondensate having an intrinsic viscosity between 0.90 and 1.80 dl/g and a degree of crystallinity of at most 80 percent, the polyester-polycondensation catalyst being catalytic means for limiting the degree of crystallinity of the high-molecular-weight polycondensate produced under the solid-phase polycondensation conditions to at most 80 percent.

2. A process according to claim 1 wherein the polyester precondensate has from 20 to 66.5 percent crystallinity.

3. A process according to claim 1 wherein the catalytic amount is from 0.001 to 2 percent by weight and the polyester-polycondensation catalyst is a member selected from the group consisting of
   a. antimony, lead and calcium, b. antimony, lead and zinc,
c. antimony, lead and manganese,
d. antimony, lead, calcium and manganese,
e. antimony, lead, calcium and zinc,
f. antimony and zinc,
g. antimony, lead and lithium,
h. antimony and manganese,
i. titanium and calcium,
j. polymeric germanium hydride and calcium,
k. polymeric germanium hydride and zinc, and
l. potassium germanide.

4. A process according to claim 3 wherein the rate of increasing viscosity at a polymerisation temperature of 235° C is at least 0.010 dl/gh.

5. A process according to claim 3 wherein the precondensate is a granuled polycondensate which has a degree of crystallinity between 33 and 58 percent, an intrinsic viscosity between 0.60 and 0.80 dl/g and a carboxylic acid value of at most 1.2 val/mol.

6. A process according to claim 3 wherein the catalyst comprises antimony, lead and calcium, the amount of antimony is up to 0.05 percent by weight, the amount of lead is up to 0.02 percent by weight and the amount of calcium is from 0.005 to 0.1 percent by weight, the percentages by weight being based on the precondensate weight.

7. A process according to claim 3 wherein polycondensing is effected in vacuo and streaming inert gas.

8. A process according to claim 3 wherein polycondensing is effected in a vacuum of from 0.01 to 1 torr and at a positive streaming rate of the inert gas of less than 2 liters per hour and per kg of solid phase condensate.

9. A process according to claim 3 wherein the polycondensate is an acid/diol reaction product, at least 85 mol percent of acid radicals of which are those of terephthalic acid and at least 85 mol percent of diol radicals of which are those of ethylene glycol.

10. A batch process according to claim 1.

11. A process which comprises removing surface moisture from quenched crystalline polyester precondensate at a temperature below 80° C over a period of several hours, then drying the resulting precondensate for several hours in vacuo at increased temperature of a residual moisture content below 0.02 percent by weight and subsequently solid-phase polycondensing thus pre-dried polyester precondensate according to claim 1.

12. A solid-phase process which comprises catalytically polycondensing crystalline polyester precondensate at an essentially constant temperature and at an essentially constant rate of increasing viscosity for a period sufficient to yield a high-molecular-weight thermoplastic polycondensate having an intrinsic viscosity between 0.90 and 1.80 dl/g and a degree of crystallinity of at most 80 percent, and polyester precondensate having:
a. a maximum carboxylic acid value of 1.4 equivalents per gram mol,
b. a maximum degree of crystallinity of 66.5 percent and
c. a maximum moisture content of 0.02 percent by weight, and being in intimate admixture with a catalytic amount of polyester-polycondensation catalyst, the polyester-polycondensation catalyst being catalytic means for limiting the degree of crystallinity of the high-molecular-weight polycondensate produced under the solid-phase polycondensation conditions to at most 80 percent.

13. A process according to claim 12 which comprises determining the rate of intrinsic-viscosity increase, which is a straight line function, during solid-phase polycondensation and terminating the solid-phase polycondensation at a time which is based upon the rate of intrinsic-viscosity increase and the intrinsic viscosity which corresponds to the high-molecular weight of said high-molecular-weight polycondensate.

* * * * *